US005107285A

United States Patent [19]

Hamada et al.

[11] Patent Number: 5,107,285

[45] Date of Patent: Apr. 21, 1992

[54] IMAGE FORMING APPARATUS WITH IMPROVED IMAGE RETAINER CLEANING MEANS

[75] Inventors: Jun-ichi Hamada; Yukio Okamoto, both of Hachioji, Japan

[73] Assignee: Konica Corporation, Tokyo, Japan

[21] Appl. No.: 494,161

[22] Filed: Mar. 15, 1990

[30] Foreign Application Priority Data

Mar. 17, 1989 [JP] Japan ..................................... 1-66788
Mar. 17, 1989 [JP] Japan ..................................... 1-66789

[51] Int. Cl.[5] ............................................. G01D 15/14

[52] U.S. Cl. .................................... 346/160; 355/296; 355/299; 355/219

[58] Field of Search ............... 355/264, 283, 296, 299, 355/219; 346/1.1, 160

[56] References Cited

U.S. PATENT DOCUMENTS

| | | | |
|---|---|---|---|
| 3,552,850 | 1/1971 | Royka et al. | 355/299 |
| 4,025,184 | 5/1977 | Mochizuki | 355/10 |
| 4,423,134 | 12/1983 | Miyakawa et al. | 430/103 |
| 4,711,555 | 12/1987 | Toshimitsu et al. | 355/14 |
| 4,827,306 | 5/1989 | Tsujimoto et al. | 355/219 |
| 4,914,480 | 4/1990 | Endo | 355/219 X |
| 4,931,841 | 6/1990 | Yoshihara | 355/299 |
| 4,949,125 | 8/1990 | Yamamoto et al. | 355/219 |
| 4,962,408 | 10/1990 | Masuda et al. | 355/299 X |

*Primary Examiner*—Benjamin R. Fuller
*Assistant Examiner*—Randy W. Gibson
*Attorney, Agent, or Firm*—Jordan B. Bierman

[57] ABSTRACT

An image forming apparatus wherein a toner image is formed in a non-image area on an image retainer and a toner is attached to a cleaning blade for cleaning residual toner by cleaning the toner image by the cleaning blade. The toner image is shaped in a slender line, a stripe, or the like. The toner image is formed every image forming process.

17 Claims, 4 Drawing Sheets

IMAGE FORMING APPARATUS WITH IMPROVED IMAGE RETAINER CLEANING MEANS

BACKGROUND OF THE INVENTION

1. Field of the Invention

The present invention relates to an image forming apparatus based on an electrophotographic system and having a blade cleaning device.

2. Description of the Prior Art

A number of methods and apparatuses have been proposed for obtaining a color image by means of an electrophotography. As disclosed in the Official Gazette on Japanese Patent Laid-Open No. 100770/1986, for instance, there is a method wherein latent images in the number corresponding to those of separating colors of an original image are formed and developed on a photosensitive drum (an image retainer) and transferred onto a transfer drum at every time of development and, after a multicolor image is thus formed on this drum, it is transferred onto a transfer material at one time, so as to obtain a color copy. An apparatus based on this method needs to be provided with the transfer drum being large enough to allow an image for one sheet to be transferred on the peripheral surface thereof, in addition to the photosensitive drum, and therefore the apparatus has inevitably a large-sized and complicated structure.

Besides, as disclosed in the Official Gazette on Japanese Patent Laid-Open No. 149972/1986, for instance, there is another method wherein the latent images in the number corresponding to those of the original copy are formed and developed on the photosensitive drum (the image retainer)and transferred onto a transfer material at every time of development, so as to obtain a multicolored color copy. In this method, it is difficult to superpose multicolored images precisely and consequently it is impossible to obtain a color copy of excellent quality.

Moreover, there is a method wherein the formation of the latent image and the development with color toner are repeated plural times corresponding to the number of separating colors of the original image on the photosensitive drum and, after the color toners are superposed on the photosensitive drum, the superposed toner is transferred at one time onto the transfer material, so as to obtain the color image. Basic processes of this multicolor image formation are disclosed in the Official Gazettes on Japanese Patent Laid-Open Nos. 75850/1985, 76766/1985, 95456/1985, 95458/1985 and 158475/1985, etc. In multicolor image forming apparatuses designed to obtain the color image by such superposition development as described above, color images of excellent quality wherein color shift is little can be obtained.

In the above-mentioned image forming apparatuses, a multicolor image is formed by the superposition development and a toner image formed on the photosensitive drum is transferred on transfer paper, while residual toner is cleaned up to prepare subsequent image formation.

As for a cleaning device, a variety of methods and devices have been proposed. As disclosed in the Official Gazette on Japanese Patent Laid-Open No. 147047/1979, for instance, there is a cleaning method of electrophotography wherein, in an electrophotographic copying apparatus wherein a remaining toner "residual toner" on the surface of a photosensitive member is removed by a cleaning blade, the cleaning blade comes into pressure contact with the photosensitive member at least before the photosensitive member is moved and the blade is detached from the surface of the photosensitive member after the member stops moving after the completion of a copying process. Besides, a blade cleaning device has been in wide use recently, wherein a cleaning edge e (a contact element) of the end part of a flat-plate-shaped cleaning blade 19A as shown in FIGS. 6(*a*) and 6(*b*) is pressed on a photosensitive drum 10 (an image retainer) so as to clean up residual toner, since the device is simple and since the toner scatters little in cleaning.

The blade cleaning device is sorted into a counter type wherein a support member 19C of the cleaning blade 19A (hereinafter called simply a blade) is positioned on the downstream side in relation to the rotation of the photosensitive drum 10 as shown in FIG. 6 (*a*), and a trail type wherein the support member 19C of the blade 19A is positioned on the upstream side as shown in FIG. 6 (*b*). The counter type is a little more excellent in a cleaning efficiency than the trail type, a load on the photosensitive drum at a contact point can be reduced, and a change in the speed of rotation of the photosensitive drum is small. Therefore, said type causes color shift little and so it is often used.

In FIG. 6 (*a*), mark $\theta$ denotes a contact angle which is an angle formed by a tangent of the photosensitive drum 10 at a contact part of the blade 19A and by the blade 19A, and t denotes the thickness of the blade 19A, while l denotes a free length from the support member 19C of the blade 19A to the fore end thereof.

The above-mentioned blade 19A is always left to be in pressure contact with the photosensitive drum 10 in some cases. However, in the apparatus wherein the above-mentioned superposition development is conducted, for instance, it is necessary to make it possible to bring the blade into pressure contact and to release the same therefrom in such a manner that the blade 19A is detached from the photosensitive drum 10 during the formation of a plurality of toner images, brought into the pressure contact for cleaning after the completion of a transfer process and then detached again when the cleaning is ended.

As for an image exposure device of the above-mentioned image forming apparatus, the device using a semiconductor laser has increased recently. In this device, laser beams modulated by image informations obtained by reading an image on an original are applied on the photosensitive drum 10, an electrostatic latent image is formed thereby, and this electrostatic latent image is developed by a developing means.

In the image forming apparatus using the laser beams, an image forming method of a reversal developing system is used generally wherein the laser beams are applied on the photosensitive drum 10 charged uniformly and toner is made to stick on a place wherefrom charge is eliminated by the application of the beams. In this method, the time of employment of a laser light source is shortened advantageously and, in addition, the image quality of a copy thus obtained is improved (the effect is remarkable especially when the original is a document). Further, a part outside an image area wherefrom the charge is not eleminated is left charged in the reversal development.

The above-mentioned blade 19A sometimes causes disadvantage that its contact part vibrates irregularly and collides with the photosensitive drum 10 (this phenomenon is called bounding) when it conducts a cleaning operation in pressure contact with the photosensitive drum 10, causing imperfection in cleaning or a damage of the blade 19A itself (a fine split of the contact part) or the occurrence of a flaw in the surface of the photosensitive drum 10. In the apparatus wherein the above-mentioned superposition development is conducted, in particular, the pressure contact and release of the blade 19A are conducted incessantly and the above-mentioned bounding tends to occur on the occasion of the pressure contact and release. Besides, this problem tends to occur also in the case when the reversal development is conducted with the blade 19A in the counter type. The bounding occurs also in an ordinary image forming apparatus, and especially when a large number of copies are prepared continuously in the condition that the size of a transfer material is small in comparison with the width of the photosensitive drum 10, this bounding occurs at a high rate.

SUMMARY OF THE INVENTION

The present invention is aimed to furnish an apparatus which enables the prevention of occurrence of the bounding by solving these problems and the execution of excellent cleaning for a long time.

The above object can be attained by an image forming apparatus wherein a process of forming an image by using toner is executed and, after the completion of the above image forming process, unnecessary toner on an image retainer such as a photosensitive drum, a transfer body or the like is cleaned up by a blade cleaning device, a toner image shaped in a slender line or a stripe being formed in the longitudinal direction of a cleaning blade on a non-image area on the aforesaid image retainer and cleaned up by the cleaning blade.

The aforesaid object can also be attained by an image forming apparatus wherein a latent image is formed by applying an irradiation light on an image retainer charged uniformly by a charger, the latent image is developed with toner to form a toner image, the toner image is transferred onto a transfer material and thereafter said image retainer is cleaned by a blade cleaning device which can be brought into pressure contact and released therefrom, the charge being eliminated by the non-operation of the charger or the application of light at least from a place whereat the cleaning blade is brought into pressure contact with the image retainer and released therefrom.

Other objects and characteristics of the present invention will be made apparent hereunder with description of drawings.

DESCRIPTION OF THE PREFERRED EMBODIMENT

First an example of experiment whereon the present invention is based and then an embodiment of the present invention will be described hereunder by using the drawings.

Figure 3:
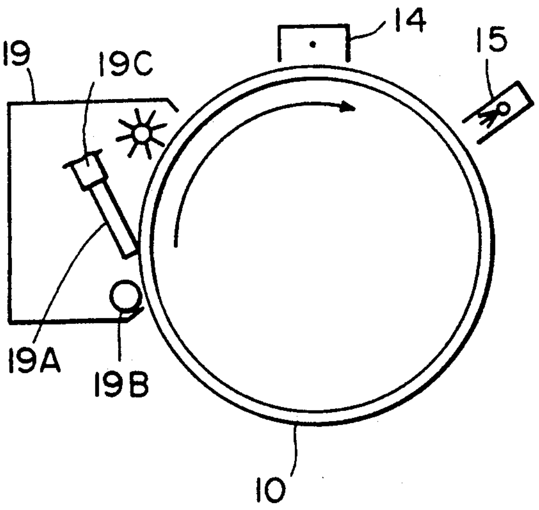
FIG. 3 is a structural view of an experimental device for bounding.

FIG. 3 is a structural view of an experimental device for bounding. The experimental device is constructed by disposing a charger 14, a lamp 15 for elimination of charge constituted of red-color LED and a cleaning device 19 having a blade 19A, a toner collecting roller 19B, etc. around the peripheral edge of a photosensitive drum 10.

By using the above-mentioned device, the relationship between a charged state of the photosensitive drum 10 and the occurrence of bounding is subjected to an experiment under the following conditions.

Conditions of experiment:

Material of blade 19A . . . polyurethane rubber, hardness 70°

Contact angle $\theta$ . . . 14°, pressure contact of the counter type

Load (partial force of a contact part of the fore end of the blade 19A in the direction perpendicular to the surface of a photosensitive body) . . . 18 g/cm Shape of blade 19A (thickness t×free length l) . . . four kinds of 2×8, 2×10, 2×12 and 3×10

Photosensitive body . . . two kinds of an organic photoconductive body (OPC) and an Se-Te photosensitive body Toner . . . supply of toner on the photosensitive body in the initial stage of the experiment Results of experiment:

Approximate results were obtained in all cases independent substantially of the shape of the blade 19A and the kind of the photosensitive body.

(A) Charging of photosensitive drum 10: bounding occurred at about 500 copies when the drum reached a cleaning device 19 at about −500 V.

(B) Charging of photosensitive drum 10: bounding occurred at 15,000 copies or more when the charge is eliminated to be about −50 V at a place whereat the blade 19A began to come into pressure contact and at a place whereat the blade was released from the contact, from the state of (A).

(C) Charging of photosensitive drum 10: bounding occurred at 25,000 copies or more when the charge is eliminated to be about −50 V from the whole area of the drum reaching the cleaning device 19.

It became clear, as described above, that the rate of occurrence of bounding lowered considerably when the charge was eliminated from an area of 10 to 15 mm before and behind the place of the photosensitive drum 10 whereat the blade 19A began to come into pressure contact or the place thereof whereat the blade was released from the pressure contact, and moreover the rate became very small when the charge is eliminated from the whole area of the drum reaching the cleaning device 19.

No bounding occurred even at 30,000 copies or more when toner of 15 mg was supplied uniformly to the whole width area (about 300 mm) of the blade 19A at every 100 copies in the state of (B) so that the toner be always present at the fore end of the blade.

When the experiment was made on the occurrence of bounding with toner T at the fore end of the blade 19A removed completely on purpose by using the above-mentioned experimental device, besides, the bounding occurred at one copy in any of the above-stated conditions of the experiment.

It was ascertained, as described above, that the rate of occurrence of bounding related to charging of the photosensitive drum 10 and the presence or absence of toner at the fore end of the blade 19A and lowered very much when the charge was eliminated from the area of 10 to 15 mm before and behind the place whereat the blade 19A began to come into pressure contact or the place whereat it was released from the pressure contact, and that the bounding did not occur substantially when the toner was present at the fore end of the blade 19A.

Moreover, the following experiment was conducted so as to know the relationship between a flight of the toner sticked to the fore end of the blade 19A and the charging of the photosensitive drum 10.

Figure 4:
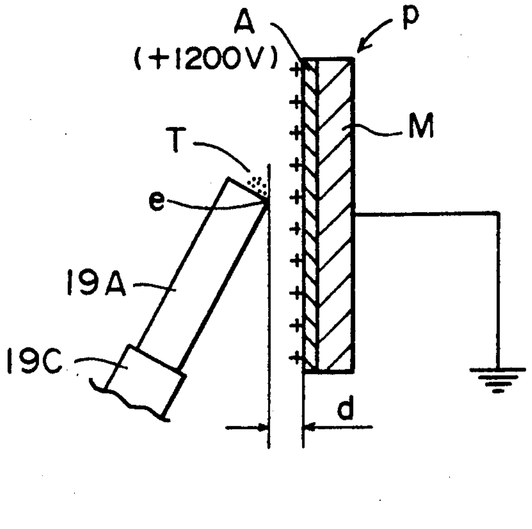
FIG. 4 is a side view of an experimental device for a flight of toner.

FIG. 4 is a side view of an experimental device for the flight of the toner. In the figure, mark e denotes a cleaning edge of the fore end of the blade 19A which comes into contact with the photosensitive drum 10, and T denotes toner. Mark p denotes a pseudo-photosensitive plate prepared by a method wherein an insulative layer A (of a thickness 75 μm) of polyethylene terephthalate (PET) simulating a photosensitive layer is spread and bonded on a grounded electroconductive metal plate M, and d denotes a distance between the cleaning edge e and the surface of the pseudo-photosensitive plate p.

By using this experimental device, an experiment was made on the relationship between the number of particles of the toner T of negative charge moving in the flight from the cleaning edge e to the pseudo-photosensitive plate p and the distance d in the case when the surface of the pseudo-photosensitive plate p was charged with +1200 V.

Figure 5:
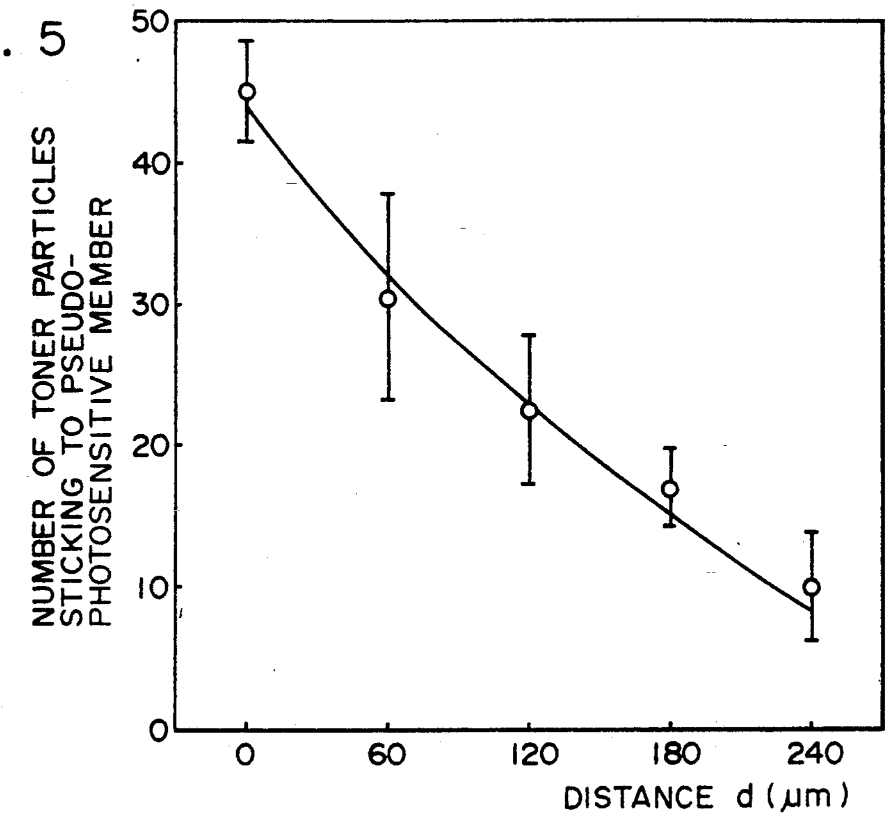
FIG. 5 is a graph showing the relationship of a distance between a blade edge and pseudo-photosensitive body with the number of flying toner.
Figure 6:
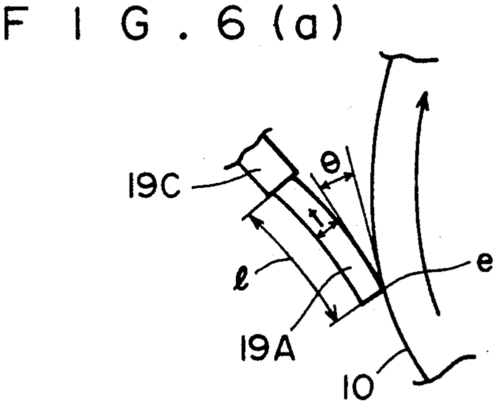
FIGS. 6(*a*) and 6(*b*) are side views showing two states of contact of a cleaning blade.
Figure 6:
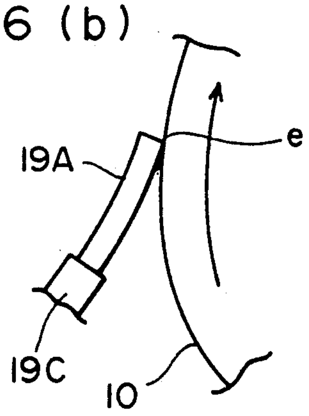

The result of the experiment shows, as graphed in FIG. 5, that the number of the moving toner particles increases as the distance d becomes short. The number on the axis of ordinate of FIG. 5 is that of the particles of the toner T moved into an area of 100×100 μm on the pseudo-photosensitive plate p. The graph shows that, a Coulomb force acts on the toner T by the electric charge on the surface of the photosensitive drum 10, so that the toner T moves toward the photosensitive drum 10 when the toner T is charged in different polarity, while it moves in the opposite direction to the photosensitive drum 10 when it is charged in the same polarity, and the reduction of the toner T being present on the part of the cleaning edge e becomes large as the Coulomb force increases.

It is supposed from the above experiment that, when a little amount of toner T sticks on the part of the cleaning edge e of the blade 19A in ordinary copying, the toner T acts as a lubricant to reduce friction, producing the effects of preventing the occurrence of bounding and prolonging the life of the blade 19A. Accordingly, it is supposed that the toner T on the part of the cleaning edge e is reduced and the bounding tends to occur when the blade 19A is brought into pressure contact and released therefrom in the state of the surface of the photosensitive drum 10 (a part outside an image area, in particular) being charged electrically, as in an image forming apparatus wherein reversal development is conducted.

Figure 7:
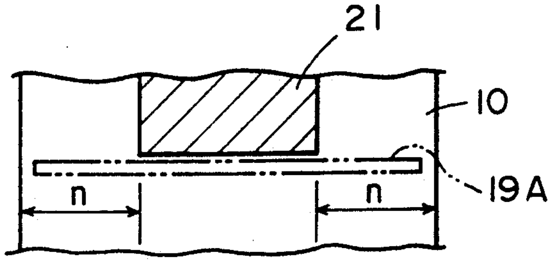
FIG. 7 is a developed view showing a case when the size of recording paper is smaller than the width of a photosensitive drum.

From the above experiments, it is assumed that the toner T acts as a lubricant to impede the occurrence of the bounding when the toner T is present on the part of the cleaning edge e, while the bounding tends to occur when the toner T is reduced and the toner T sticked to the part of the cleaning edge e turns absent. It is understandable therefrom that, when the size of recording paper is small in comparison with the width of the photosensitive drum 10 as shown in FIG. 7, the rate of occurrence of the bounding increases on the outside n of an image area 21 at the time when copying is conducted successively in this state, since the toner T is absent on said part.

Figure 1:
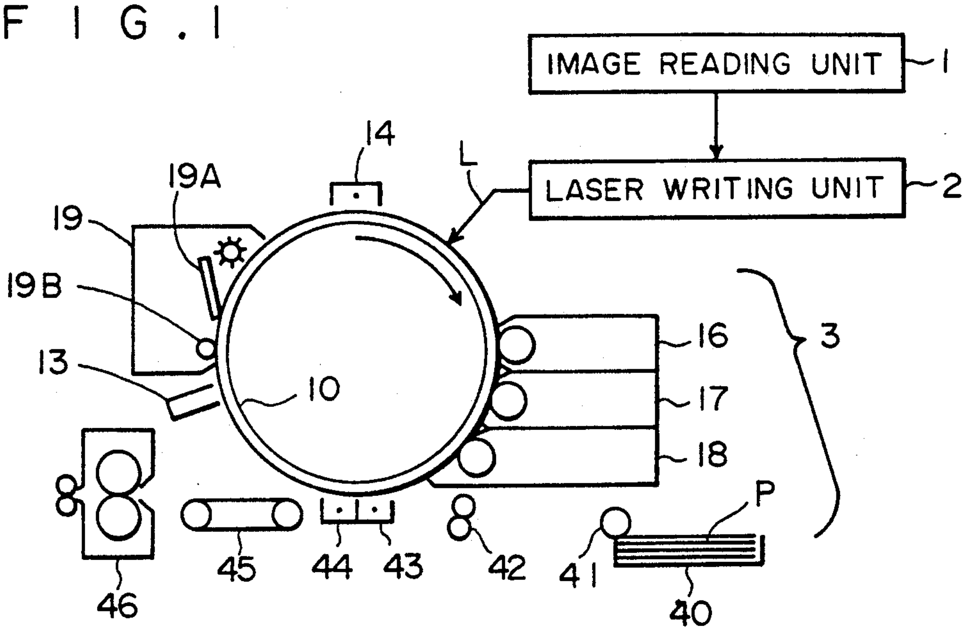
FIG. 1 is a structural view of one embodiment of the present invention.

FIG. 1 is a structural view of one embodiment of the present invention, wherein reversal development is conducted. In the figure, numeral 1 denotes an image reading unit, 2 each unit of a laser writing unit, and 3 an image reproducing unit. A color image is formed by the following processes.

In the image reading unit 1, an original copy held on a document glass plate is irradiated and scanned by an optical reading system moving in the horizontal direction synchronously with a circumferential speed of rotation of the photosensitive drum 10 which is an image retainer, and a reflected light therefrom is led out to a lens reading unit comprising a lens, a color separation prism or a color filter, a color CCD, etc. The reflected light from the document is condensed by the aforesaid lens and imaged on the light-sensing plane of the CCD which is a light-receiving element.

Image signals of B, G and R outputted from the color CCD, for instance, are subjected to color correction and other processings in an image information processing unit, and they are outputted therefrom as color signals corrected in color in accordance with the colors of Y, M and C toners T and inputted to the aforesaid laser writing unit 2 which is an exposure means.

In a laser writing unit 2, a laser beam L generated by a semiconductor laser is subjected to a rotating scan by a rotating polygon mirror. The optical path of the beam is bent by the mirror through an fθ lens and the beam is made to scan and expose the circumferential surface of the photosensitive drum 10 whereon a charge is applied beforehand by the charger 14 which is a charging means.

When scanning is started, modulation of the laser beam L by a first color signal is started and the modulated laser beam I, scans the circumferential surface of the photosensitive drum 10. By the main scanning by the laser beam L and a sub-scanning with the rotation of the photosensitive drum 10, an electrostatic latent image for the first color is formed on the circumferential surface of the photosensitive drum 10. This latent image is developed reversely by a developing device 16, which is charged with yellow (Y) toner, for instance, and thereby a visible toner image is formed. The toner image thus obtained passes under the cleaning device 19, which is held apart from the circumferential surface of the photosensitive drum 10, while it is retained on the drum 10, and enters a subsequent copying cycle.

In the subsequent copying cycle, the photosensitive drum 10 is charged again by the charger 14. Then, a second color signal outputted from the image information processing unit is inputted to the aforesaid writing unit 2 and writing on the circumferential surface of the photosensitive drum 10 is conducted in the same way as in the case of the above-mentioned first color signal, so that a latent image be formed. This latent image is subjected to the reversal development by a developing device 17 charged with the toner T of magenta (M), for instance, as a second color. A toner image of this magenta (M) is formed in superposition on the aforesaid toner image of yellow (Y) which is already formed.

A developing device 18 is provided with the toner of a cyan (C) color, and it forms a toner image of cyan (C) on the photosensitive drum 10 on the basis of an image signal generated in the image information processing unit. These developing devices 16, 17 and 18 are so designed that a DC bias voltage or DC and AC bias voltages are applied on developing sleeves thereof and that non-contact development wherein the developing sleeves are not in contact with the photosensitive drum 10 is conducted thereon by a two-component developer.

The color toner images formed on the circumferential surface of the photosensitive drum 10 in this way are transferred on recording paper P, which is a transfer material, fed from a paper feeding cassette 40 by a paper feeding roller 41 and resist rollers 42, at a transfer device 43 provided as a transfer means. The recording paper P whereon the color toner images are transferred is separated from the photosensitive drum 10 by a separator 44 and conveyed to a fixing device 46 through a conveyance belt 45, and fixation of the toner images is conducted in this device. A copied image thus completed is discharged outside the device.

Meanwhile, the blade 19A of the cleaning device 19 comes into contact with the photosensitive drum 10 from the circumferential surface of which the recording paper P is separated, and the residual toner T is thereby removed. After the completion of the removal, the blade is detached from the circumferential surface of the drum and an entry is made into the process of formation of another color image.

Figure 2:
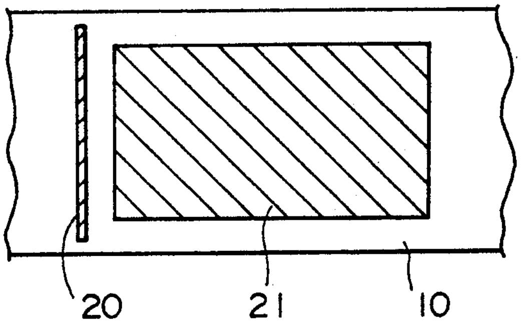
FIG. 2 is a developed view of a slender line toner image of the embodiment of FIG. 1.
Figure 8:
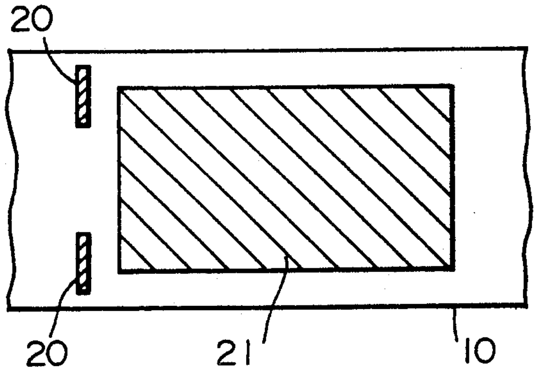
FIG. 8 is a developed view of a slender line toner image of the another form.

In the image forming apparatus of the present invention, a program is incorporated in CPU of a control unit so that a latent image in the shape of a slender line is formed, in every copying, perpendicularly to the direction of rotation of the photosensitive drum 10 and corresponding to the width of the blade 19A outside the area 21 for an image to be copied, by the laser beam L, and it is developed to form a slender-line toner image 20 as shown in FIG. 2. The color of the slender-line toner image 20 may be formed of any one of cyan (C), magenta (M) and yellow (Y), or may be formed by superposing them. By this image, the toner T is supplied in an appropriate quantity to the cleaning edge e. The toner T need not be supplied for each copying, and it may be supplied intermittently for every 100 copies, for instance. Besides, the aforesaid slender-line toner image 20 may also be a stripe-shaped toner image, and it need not be extended to the whole width of the photosensitive drum 10. Furthermore, it may be formed of a plurality of separated images, or formed of two separated images arranged on both sides of the image area as shown in FIG. 8.

The first embodiment described above relates to the image forming apparatus wherein the reversal development is conducted, and in this embodiment, the toner is supplied to the fore end part of the cleaning blade 19A to prevent the occurrence of the bounding by the means of forming the slender-line-shaped or stripe-shaped toner image 20 outside the image area, for the case wherein the cleaning blade 19A is brought into pressure contact with the photosensitive drum 10 and released therefrom repeatedly and this tends to the occurrence of the bounding.

The formation of this slender-line toner image 20 is effective not only for the image forming apparatus wherein the reversal development is conducted, but also for an image forming apparatus wherein ordinary development is conducted. In the image forming apparatus wherein the ordinary development is conducted, a line-shaped LED array is provided in the same way as a charging electrode in the periphery of the photosensitive drum, in parallel with the axis of rotation and along a part of the photosensitive drum between the charger and the developing device, and in order to eliminate an electric charge of a part other than the aimed image area, the LED array is lighted corresponding to the length of this part requiring the elimination, whereby the part of the latent image is erased. In order to form the above-mentioned slender-line toner image, accordingly, the LED array is controlled to stop lighting in the shape of a line approximate to the width of the blade, and the slender-line toner image is formed by making the toner stick by development on the part for which the lighting is stopped. The effect produced by forming the slender-line toner image in this way is the same as in the first embodiment.

In addition, a charge eliminating device 13 is provided on the upstream side of the cleaning device 19, for the photosensitive drum 10 from the circumferential surface of which the recording paper P is separated. The charge eliminating device 13 constituted of a charge eliminating lamp or a combination of the charge eliminating lamp and a discharger operates to eliminate the charge so that excellent cleaning be performed and further that the occurrence of the bounding be prevented. Besides, the blade 19A of the cleaning device 19, which is set back during the formation of the image, is brought into pressure contact with the photosensitive drum 10 to remove the residual toner T and detached from the circumferential surface of the drum after cleaning is ended, and an entry is made into a process of formation of another color image.

In the image forming apparatus of the present invention, a program is incorporated in the CPU of the control unit so as not to make the charger 14 operate, but to maintain a non-charged state, in every copying, for a part of at least 10 to 15 mm before and behind the place whereat the aforesaid cleaning edge e begins to come into pressure contact and the place whereat it is released from the contact, outside the area of the image to be copied.

The aforesaid non-charged state can be brought about also by a method wherein, after the charger 14 is operated, the laser beam L is applied to eliminate the charge therefrom. Besides, it can be brought about also by putting the charger in non-operation and irradiating said part by the laser beam L.

While the above-mentioned bounding is prevented by this charge elimination, a still larger effect can be attained by conducting the charge elimination additionally prior to the operation of the cleaning device 19 by means of the charge eliminating device 13 provided on the upstream side of the cleaning device 19.

The present invention can be applied likewise to an image forming apparatus having a transfer belt and a transfer drum which hold transfer paper, as shown in FIGS. 9–12.

In FIGS. 9–12, parts similar those in FIG. 1 are shown with the same reference numerals.

In FIGS. 9–12, reference numeral 22 denotes a developing device charged with black (BK) toner, and 23 is a transfer belt, 24 is a transfer drum, 25 is a photosensitive belt as an image retainer, and 26 is a cleaning blade for the transfer belt or transfer drum.

Specifically, the bounding of the cleaning blade acting on the transfer member, such as transfer belt or drum can be prevented from being occurred by forming on the transfer member the slender-line toner image 20 as like as that on the photosensitive drum in the image forming apparatus wherein the toner image is transferred through the transfer member.

Figure 9:
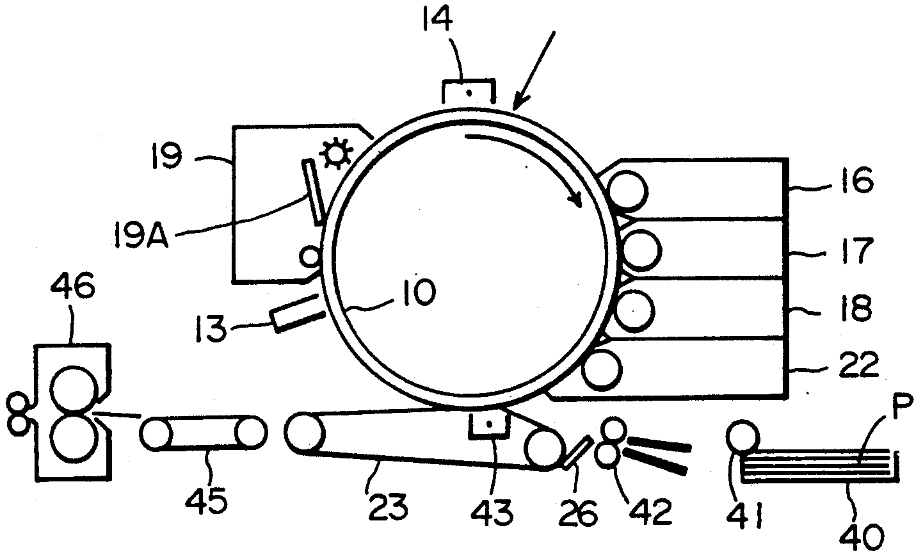
FIGS. 9–12 are structural views of an image forming apparatus in another embodiments of the present invention, respectivly.

FIG. 9 shows an example of a color image forming apparatus of the present invention having a photosensitive drum 10 and a transfer belt 23. Each toner image of monochromatic color is formed on the peripheral surface of the photosensitive drum 10 every rotation thereof by the charging, the light exposure and developing. A color toner image is formed by superposing the toner images of monochromatic colors. During the toner image formation process, the cleaning blade 19A and the transfer belt 23 have been separated from the photosensitive drum 10.

The color toner image formed on the photosensitive drum 10 is transferred onto a recording paper which is fed between the photosensitive drum 10 and the transfer belt 23, which has been brought into pressure contact with the photosensitive drum 10. The recording paper with the transferred toner image is fed through the conveyance belt 45 to the fixing device 46. On the other hand, the photosensitive drum 10 and the transfer belt 23 from which the recording paper has been left are cleaned by the cleaning blades 19A and 26, respectively.

During the transfer process, the slender-line toner image 20 in the transfer area on the photosensitive drum 10 is transferred onto the transfer belt 23 so that toner is supplied to the cleaning blade 26, whereas the slender-line toner image 20 in the area other than the transfer area remains on the photosensitive drum 10 so that toner is supplied to the cleaning blade 19A which has been brought into pressure contact with the photosensitive drum 10.

It is sufficient to use only one of the slender-line toner image of monochromatic color to effect the cleaning operation for the photosensitive drum 10 and the transfer belt 23 and to obtain a copy of high grade image quality having no soiled back.

Figure 10:
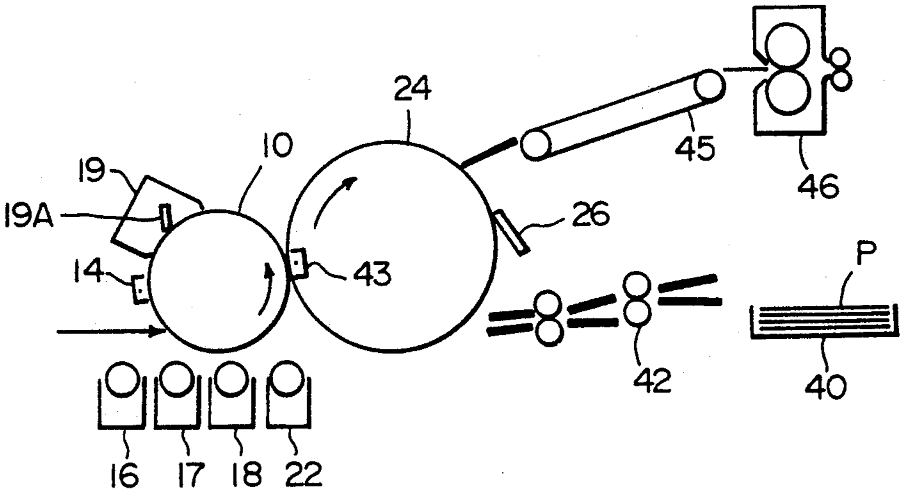

FIG. 10 shows an example of a color image forming apparatus of the present invention having a photosensitive drum 10 and a transfer drum 24. Each toner image of monochromatic color is formed on the peripheral surface of the photosensitive drum 10 every rotation thereof by the charging, the light exposure and developing. Each toner image is transferred every rotation of the photosensitive drum 10 onto a recording paper wound around the transfer drum 24 and the residual toner on the photosensitive drum 10 is cleaned by the cleaning blade 19A. Thus, a multi-color toner image is formed on the recording paper by a plurality of rotations of the photosensitive drum 10 and the transfer drum 24 synchronizing with the photosensitive drum 10.

During the toner image formation on the photosensitive drum 10, the cleaning blade 19A has been separated from the photosensitive drum 10, whereas during the transfer of the toner image to the recording paper, the cleaning blade 26 has been separated from the transfer drum 24.

The recording paper to which the multi-color toner image has been transferred is separated from the transfer drum 24 by wedge-shaped clamp releasing means and fed to the fixing device 46 by the conveyance belt 45 whereas the transfer drum 24 is cleaned by the cleaning blade 26 which is brought into pressure contact with the transfer drum 24.

Figure 11:
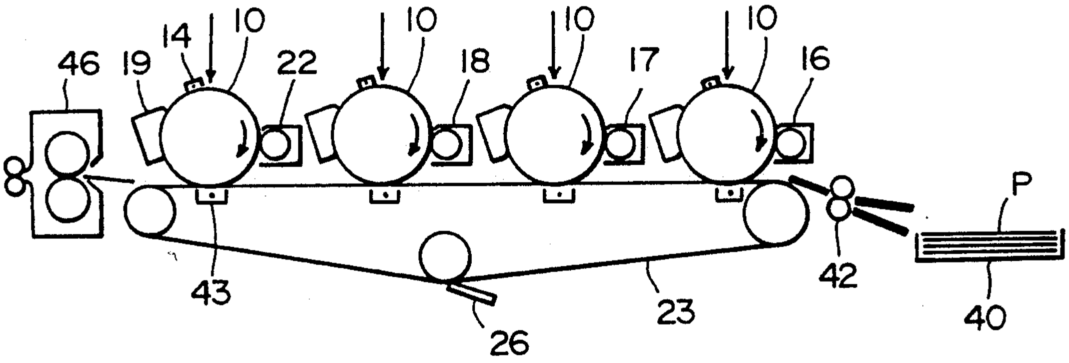

During the transfer process, the slender-line toner image 20 in the transfer area on the photosensitive drum 10 is transferred onto the area other than the image area on the transfer drum 24 so that toner is supplied to the cleaning blade 26, whereas the slender-line toner image 20 in the area other than the transfer area remains on the photosensitive drum 10 so that toner is supplied to the cleaning blade 19A. FIG. 11 shows an example of a color image forming apparatus of the present invention having a plurality of photosensitive drum 10 and a transfer belt 23. Each toner image of monochromatic color is formed on the peripheral surface of each photosensitive drum 10 and transferred successively onto a recording paper fed by the transfer belt 23 so that the toner images are superposed on the recording paper to form a multi-color toner image thereon. During the toner image formation and the transfer, the cleaning blades are brought into pressure contact with the photosensitive drum 10 and the transfer belt 23, respectively, while the transfer belt 23 is brought into pressure contact with the photosensitive drum 10.

The recording paper with the transferred toner images is separated from the transfer belt 23 and fed to the fixing device 46. On the other hand, the photosensitive drum 10 and the transfer belt 23 from which the recording paper has been left are cleaned by the cleaning blade 19A and 26, respectively.

During the transfer process, each slender-line toner images 20 formed in the area other than the transfer area on each photosensitive drum 10 remains therein as it is, whereas the slender-line toner image 20 formed in the transfer area on any one of the photosensitive drums 10 is transferred onto the transfer belt 23.

Accordingly, each slender-line toner image 20 formed in the area other than the transfer area on each photosensitive drum 10 is used for supplying toner to the cleaning blade 19A in the cleaning device 19, and the slender-line toner image 20 formed in the transfer area is used for supplying toner to the cleaning blade 26.

Figure 12:
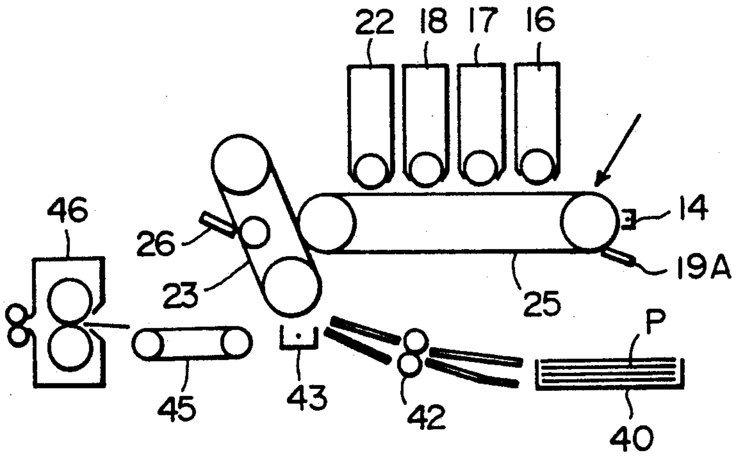

FIG. 12 shows an example of a color image forming apparatus of the present invention having a photosensitive belt 25 and a transfer belt 23. Each toner image of monochromatic color is formed on the photosensitive belt 25 every rotation thereof by the charging, the light exposure and developing. Each toner image is transferred every rotation of the photosensitive belt 25 onto the transfer belt 23 and the residual toner on the photosensitive belt 25 is cleaned by the cleaning blade 19A. Thus, a multi-color toner image is formed on the transfer belt 23 by a plurality of rotations of the photosensitive belt 25 and the transfer belt 23 synchronizing with the photosensitive belt 25. The multi-color toner image formed on the transfer belt 23 is transferred onto the recording paper fed to the transfer portion. The recording paper with the toner image is fed to the fixing device 46 by the conveyance belt 45. During the transfer process from the transfer belt 23 to the recording paper, the cleaning blade 26 acting on the transfer belt 23 is separated from the transfer belt 23, but brought into pressure contact with the transfer belt 23 for cleaning after the transfer is completed.

In the above process, the slender-line toner images 20 of any one of monochromatic colors are formed, one of which remains on the photosensitive belt 25 and other is transferred onto the transfer belt 23 to supply toner to the corresponding cleaning blade 26.

Effect of the Invention

Since the toner image of the slender line approximating to the width of the cleaning blade is formed outside the image area and the toner is supplied uniformly to the whole area of the blade width of the cleaning blade in every copying or intermittently according to the present invention, as described above, it has been made possible to furnish the image forming apparatus which enables the prevention of the occurrence of bounding and the breakdown of the cleaning blade, the execution of excellent cleaning for a long time, and the consequent attainment of images of excellent quality.

Since charge is eliminated at least from the vicinity of the place whereat the cleaning blade comes into contact or the place whereat it is released therefrom, outside the image area in every copying, in addition, it becomes possible to furnish the image forming apparatus which enables the prevention of the occurrence of the bounding and the breakdown of the cleaning blade, the execution of excellent cleaning for a long time, and the consequent attainment of images of excellent quality.

What is claimed is:

1. In an image forming apparatus comprising means for forming a toner image by developing with toner, means for transferring said toner image to a transfer material and means for cleaning residual toner from an image retainer, by a blade cleaning device, the improvement characterized in that means is provided for forming a second toner image in a direction perpendicular to the cleaning blade on at least a non-image area on said image retainer whereby toner is attached to said cleaning blade by cleaning said second toner image with said cleaning blade.

2. The apparatus of claim 1 wherein said second toner image has a length substantially equal to an axial length of a contact portion between said cleaning blade and said image retainer.

3. The apparatus of claim 1 wherein said second toner image is formed each time after a predetermined number of image formations have been completed.

4. The image forming apparatus according to claim 1, wherein said toner image is shaped in a slender line.

5. The image forming apparatus according to claim 1, wherein said toner image is shaped in a stripe.

6. The image forming apparatus according to claim 1, wherein said toner image is formed at every image forming process.

7. The image forming apparatus according to claim 1, wherein said toner image is formed before the cleaning blade is brought into contact with the image retainer.

8. The image forming apparatus according to claim 2, wherein said toner image is formed at every image forming process.

9. The image forming apparatus according to claim 3, wherein said toner image is formed at every image forming process.

10. The image forming apparatus according to claim 2, wherein said toner image is formed before the cleaning blade is brought into contact with the image retainer.

11. The image forming apparatus according to claim 3, wherein said toner image is formed before the cleaning blade is brought into contact with the image retainer.

12. The image forming apparatus according to claim 4, wherein said toner image is formed before the cleaning blade is brought into contact with the image retainer.

13. The image forming apparatus according to claim 8, wherein said toner image is formed before the cleaning blade is brought into contact with the image retainer.

14. The image forming apparatus according to claim 9, wherein said toner image is formed before the cleaning blade is brought into contact with the image retainer.

15. In an image forming apparatus comprising means for forming a latent image by applying a light exposure on an image retainer charged uniformly by a charger, means for developing said latent image with toner to form a toner image, means for transferring said toner image onto a transfer material and, thereafter, means for cleaning said image retainer with a cleaning device brought into and released from pressure contact with said image retainer, the improvement characterized in that there is further provided means for preventing application of a charge to a portion of said image retainer at a position wherein said cleaning device is brought into and released from pressure contact with said image retainer during charging.

16. In an image forming apparatus comprising means for forming a latent image by applying a light exposure on an image retainer charged uniformly by a charger, means for developing said latent image with toner to form a toner image, means for transferring said toner image onto a transfer material and, thereafter, means for cleaning said image retainer with a cleaning device brought into and released from pressure contact with said image retainer, the improvement characterized in that there is further provided means for eliminating charge from a portion of said image retainer at positions wherein said cleaning device is brought into and released from pressure contact with said image retainer after charging and before cleaning.

17. The apparatus of claim 16 wherein charge is eliminated by light emitted from a light emitting means.

* * * * *